Figure 1:
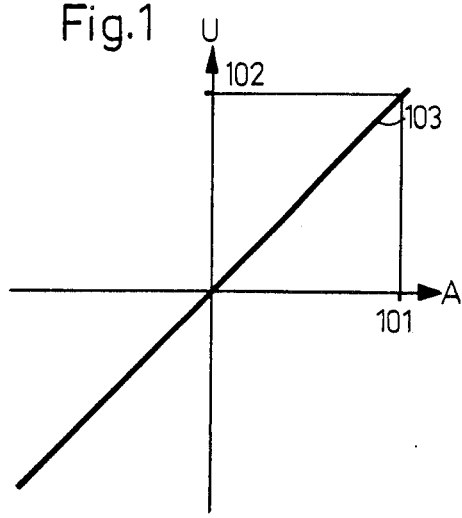

United States Patent [19]
Stridsberg

[11] Patent Number: 4,660,981
[45] Date of Patent: Apr. 28, 1987

[54] METHOD AND APPARATUS FOR CALIBRATING A POSITIONING SYSTEM

[75] Inventor: Gustaf L. Stridsberg, Enskede, Sweden

[73] Assignees: Mydata AB, Stockholm; UIC Nordic AB, Vallingby, both of Sweden

[21] Appl. No.: 671,685

[22] Filed: Nov. 15, 1984

[30] Foreign Application Priority Data

Nov. 17, 1983 [SE] Sweden ................. 8306347

[51] Int. Cl.$^4$ ............................................. G01B 11/14
[52] U.S. Cl. ..................................... 356/375; 356/398
[58] Field of Search ....................... 356/375, 398, 395; 250/236, 255

[56] References Cited

U.S. PATENT DOCUMENTS 2,143,011  1/1939  Juhasz ................................. 356/138
2,880,512  4/1959  Fenemore et al. .................. 356/395
3,727,055  4/1973  David et al. ......................... 250/224
4,082,463  4/1978  Dehait et al. ........................ 356/398

Primary Examiner—R. A. Rosenberger
Assistant Examiner—Crystal D. Cooper
Attorney, Agent, or Firm—Burns, Doane, Swecker & Mathis

[57] ABSTRACT

The invention relates to a method and an apparatus for calibrating a positioning system, including control means (209) sending command signals to the positioning apparatus (204) intended during a working state to locate an object (203) in relation to an operating area (206), the situation of the apparatus being sensed and converted to an actual value signal which is sent to the control means. The positioning apparatus has a working state which is interrupted at given intervals by a calibrating state, during which the positioning apparatus is accurately put in register with at least one detector (208), situated within the operating area in a given position. The output signals from the detectors are allowed to activate the control means, whereafter the actual value signal is determined and the positioning apparatus calibrated in response to the determined actual value signal.

8 Claims, 8 Drawing Figures

METHOD AND APPARATUS FOR CALIBRATING A POSITIONING SYSTEM

The present invention relates to a method of calibrating a positioning system which includes a control means sending command valve signals to a positioning apparatus intended, during a working state, to locate an object in relation to an operating area, the location of the positioning apparatus being sensed and converted to an actual valve signal, which is fed back to the control means. The invention also relates to the apparatus for carrying out the method.

Positioning systems have great importance. In component assembly machines they are used to see that the components are fitted in the right place, in drilling machines and the like to see that the drill bores in the right place, in pointing systems to see that the right place is pointed to, and in a draughting machine to see that the pen is at the right place.

The control unit in a positioning system must be given information as to the actual position of the positioning apparatus in the system, for example where the light beam points in a pointing system. This information is provided by some form of transducer. Transducers have different types of deficiency, and the properties of a transducer can be assessed from a number of criteria. Some of these are dealt with below for an angular transducer which has an output voltage varying linearly with the torsional angle it registers. The criteria are illustrated in FIGS. 1–5, where the torsional angle A is the coordinate on the horizontal axis 101, and the output signal voltage U the coordinate on the vertical axis 102. The function of a perfect transducer of this kind is given in FIG. 1 by the line (103), where $$U = Kt \cdot A \tag{1}$$

where Kt is a constant depending on the type of transducer.

Figure 2:
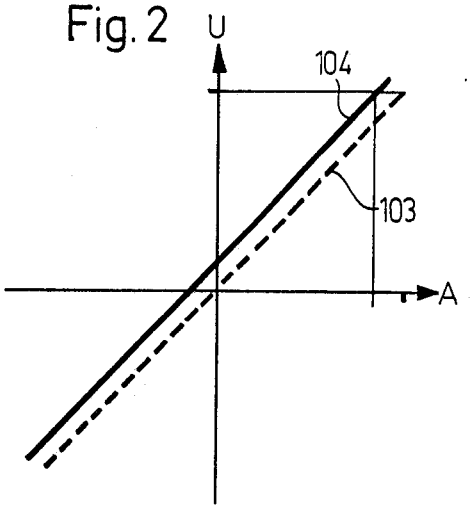

(a) ZERO POINT ERROR is illustrated by the line 104 in FIG. 2. For a transducer differing from the perfect transducer solely in this respect the following applies:

$$U = Ni + Kt \cdot A \tag{2}$$

where Ni is the zero error. This error i different for different transducers within the same transducer type. This error can easily be adjusted by subtracting a constant Ni from the measured value, for example by adjusting an associated trimming potentiometer.

Figure 3:
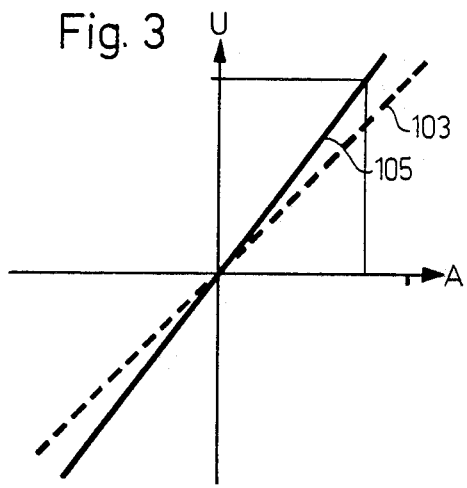

(b) AMPLIFICATION ERROR is illustrated by the line 105 in FIG. 3. For a transducer differing from the perfect one solely in this respect the following applies:

$$U = Fi \cdot Kt \cdot A \tag{3}$$

where Fi is the individual amplification error for the transducer in question. This error can easily be adjusted by altering the measured value by a constant factor 1/Fi, for example by adjusting an associated potentiometer.

Figure 4:
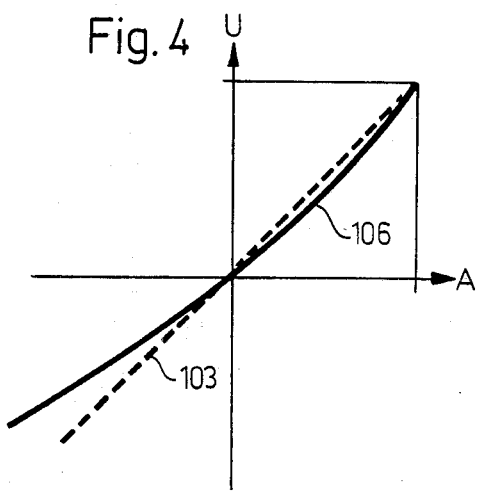

(c) NON-LINEARITY is illustrated by the line 106 in FIG. 4. For a transducer differing from the perfect one solely in this respect the following applies:

$$U = Kt \cdot A + Lt(A) \tag{4}$$

where Lt(A) is the common non-linearity for all transducers of a certain type. In a computerized system, non-linearity may be relatively easily adjusted by allowing the system to use the measured value and correction factor, e.g. obtained from tables inserted in the program, to calculate the input value. A common example is a thermocouple for temperature measurement.

Figure 5:
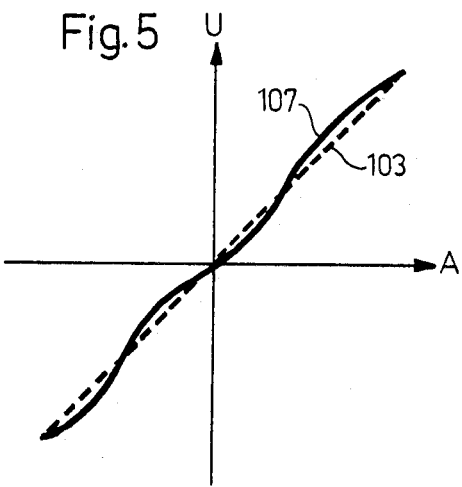

(d) LINEARITY ERROR is illustrated by the line 107 in FIG. 5. For a transducer differing from the perfect one solely in this respect the following applies:

$$U = Kt \cdot A + Ei(A) \tag{5}$$

where Ei(A) is the individual linearity error for the transducer in question. The error is different for different transducers within the same type. This error may be remedied with the aid of calibration tables worked out for the transducer in question. This is very rarely done.

(e) DRIFT ERROR is here intended to mean that the transducer properties are altered, either in time or as a result of such as temperature or supply voltage. This kind of error may be counteracted by keeping the magnitudes affecting the transducer properties constant. Keeping a supply voltage constant is normally simple, but keeping a constant working temperature often results in a complex design and long starting times before the equipment is usable.

(f) REPEATABILITY is here intended to means how large an input value range for which the transducer can give the same output value. Digital angle transducers can only give a certain number of different values, and will thus give the same output numerical value for an entire angular interval. For example, if the transducer has 1000 digit combinations per revolution, then it will give the same output data for the angular interval of at least one-thousandth of a revolution. Analogue angular transducers can give an infinite number of values, but still give the same output data for an interval including different angles due to noise, hysteresis and other effects.

The main object of the invention is to provide a method and an apparatus that will enable achieving good accuracy when using transducers having considerable linearity error, temperature drift and slow time-dependent drift. The sole demands made on the transducer in accordance with the invention is that it shall have good repeatability over a short time and that its linearity error will be small within small angular intervals.

This object is realized in accordance with the method essentially in that detectors are placed within the operating area in given positions, and in that the working state of the positioning apparatus is interrupted by a calibration state at given time intervals, during the latter state the positioning apparatus being carefully aligned with at least one of the detectors, such that the output signal of the detector is allowed to activate the control means, whereafter the actual value signal is measured for calibrating the positioning apparatus in relation to the measured actual value signal.

The apparatus according to the invention is substantially characterized in that detectors are arranged at given positions within the operating area, said detectors being connectable to the control unit, and that for given occasions the control means is adapted to put the object in register with at least one detector and to receive an output signal from the detector, and that for an optimum signal from the detector the control means compares the actual value signal for the position of the object with information on the position of the detector, for calibrating the positioning apparatus.

Although not restricted to them, the invention primarily relates to systems where positioning is controlled by one or more galvanometers. Galvanometers are motors which rotate their shafts through a limited angle, e.g. 15°, in either direction. The galvanometer may be integrated with an angle transducer which must fulfill a number of conflicting requirements. This is due to the rapid angular movement of the galvanometer shaft. The moving part of this transmitter must therefore have low mass and must also withstand high speeds. To achieve an accuracy better than 0.1% over the entire operating area has so far required an advanced and therefore expensive implementation. In more sophisticated cases there is required, inter alia, a constant temperature in the whole of the structure on which the galvanometer is mounted.

It is, however, relatively simple to manufacture galvanometer transducers that do indeed have noticeable linearity and drift errors, but have high repeatability. In many applications, the inventive method and apparatus enable achieving the same or better accuracy with such transmitters than can be obtained at present with much more expensive configurations.

Figure 6:
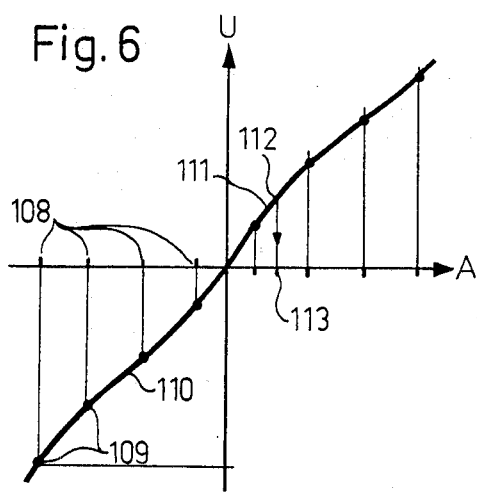
Figure 7:
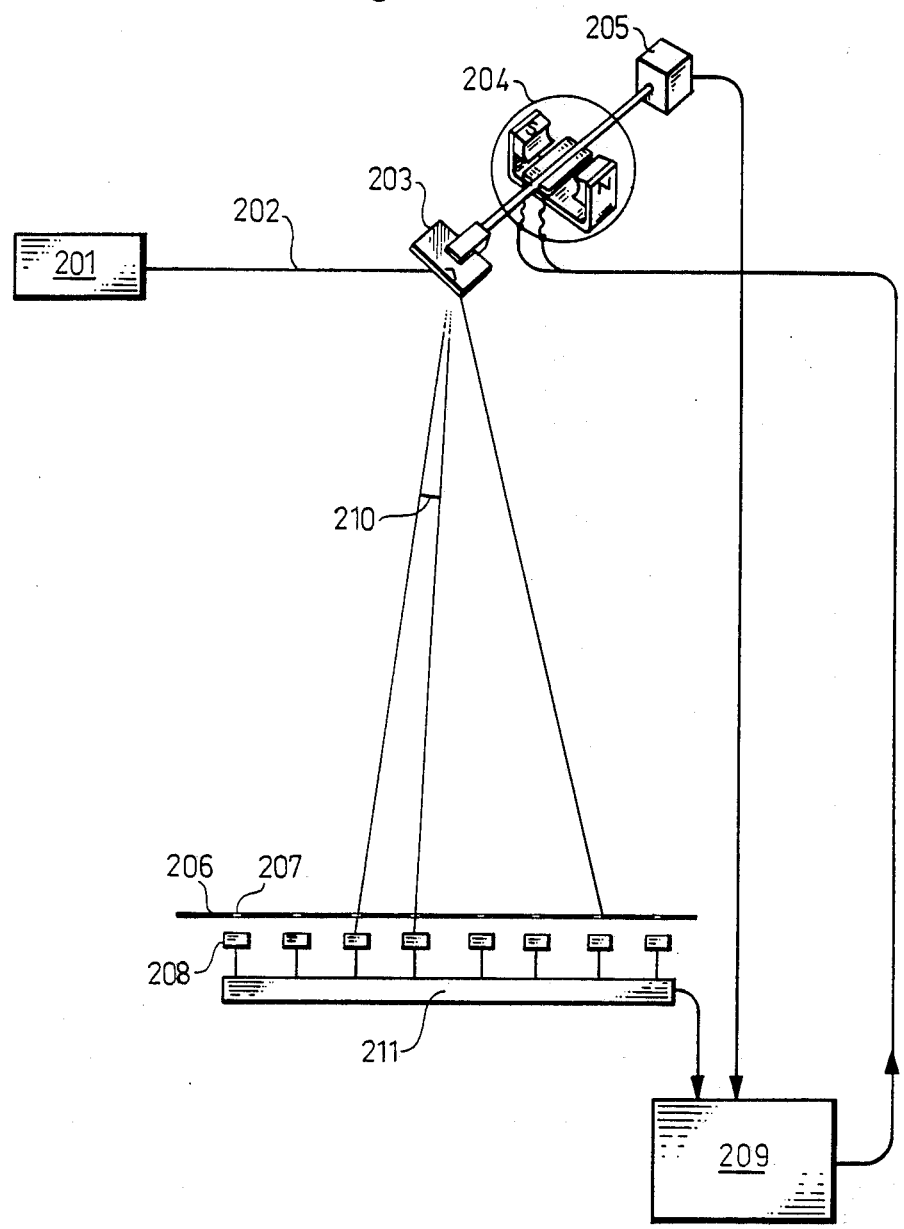
Figure 8:
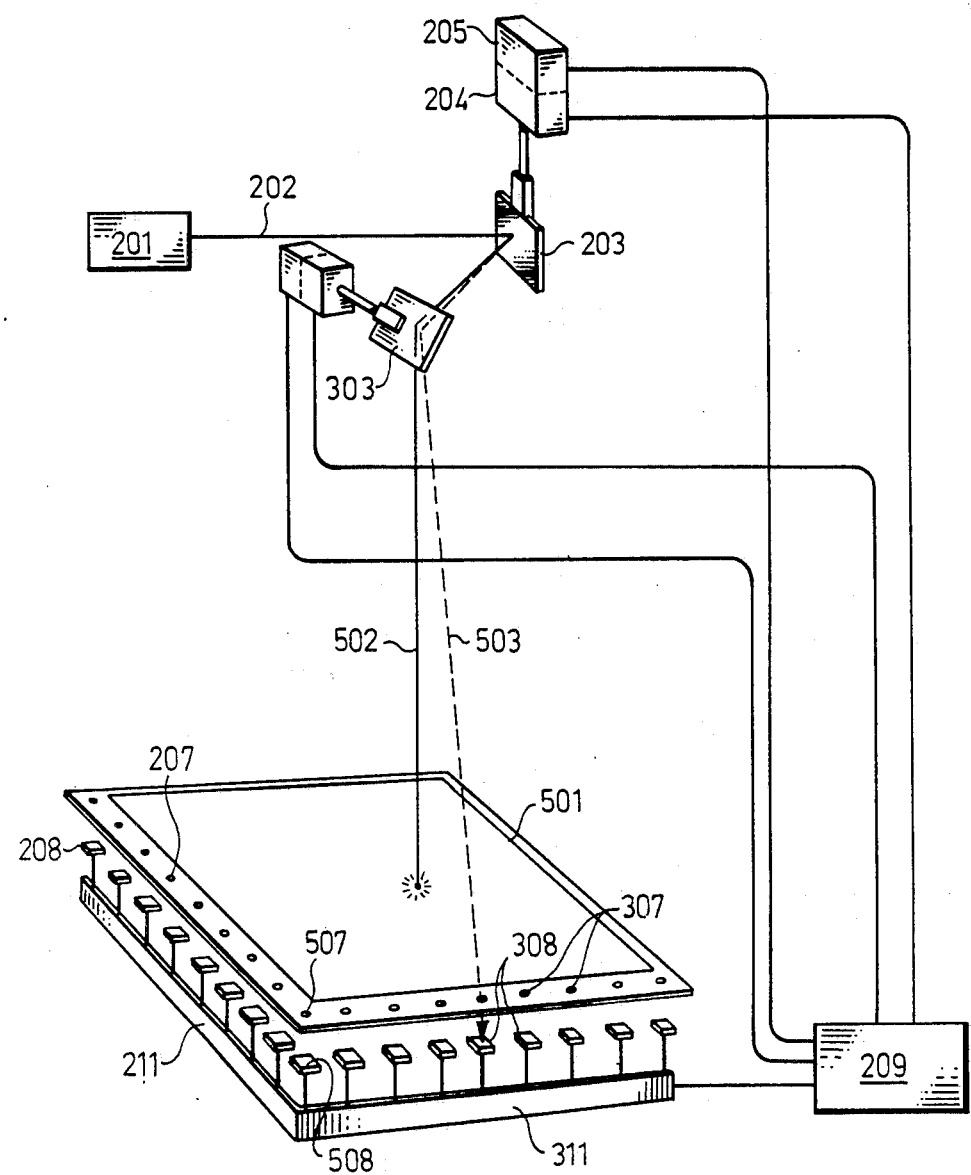

The invention will now be described in detail with reference to the accompanying drawings, on which FIG. 1 illustrates the transmission function for an ideal transducer, FIG. 2 illustrates the transmission function for a transducer with zero point error, FIG. 3 illustrates the transmission function for a transducer with amplification error, FIG. 4 illustrates the transmission function for a transducer with non-linearity, FIG. 5 illustrates the transmission function for a transducer with linearity error, FIG. 6 illustrates the transmission function for a transducer with linearity and drift errors as utilized in the invention, FIG. 7 illustrates the apparatus in accordance with the invention as applied to a system based on galvanometer transducers, FIG. 8 illustrates the inventive apparatus as applied to a pointing system using two galvanometers.

It is emphasized that FIG. 7 illustrates the invention applied to a system with only one galvanometer for the sake of clarity, and although there is no great practical use for such a system it discloses the principle.

A light source 201 sends a light beam 202 to a mirror 203 which is rotated by a galvanometer 204. The angular excursion of the mirror is sensed by the transducer 205. The beam is directed towards an operating area 206. In this, there are a number of holes 207, and under each of them there is a light-sensitive detector 208. These holes are part of one embodiment of the inventive apparatus, for which other embodiments are also possible. The control computer 209 sends commands to the galvanometer 204 and receives output signals from the transducer 205 and can also interpret the light intensity incident on the detectors 208. The appropriate detector is selected by the multiplexer 211.

The angle 210 between the different detectors 207 as seen from the mirror 203 is assumed to be known. On the basis of the data thus available the control computer can calibrate the transducer 205 at suitable intervals by allowing the beam to scan the detectors 208. These are placed sufficiently closely for the linearity error of the transducer for the mentioned angle between the detectors to be small enough for achieving the desired accuracy. Calibration is performed often enough for ensuring that the transducer 205 will not drift between calibrations to an extent affecting accuracy more than can be accepted.

The functional principle of the apparatus is depicted in FIG. 6. The angles between the detectors are known and are plotted as dots 108 in the Figure. After determining the value U sent by the transducer for each detector, the correct dots 109 may be plotted. A calibrated signal function 110 for the transducer may now be determined. When the control computer then evaluates an output signal 111 from the transducer 205 it can utilize the function 110 for calculating the angle 113 via the point 112.

FIG. 8 illustrates the inventive apparatus applied to a pointing system using two galvanometers. As in FIG. 7, a light source 201 sends a beam to a mirror 203 which is rotated by a galvanometer 204. The angular position of the mirror is sensed by the transducer 205. The beam continues to a mirror 303 rotated by a galvanometer 304. The angular position of the mirror is sensed by a transducer 305. The beam has now been deflected towards a working surface which is restricted by a rectangular frame 501.

Within the operating area but, outside one side of the frame 501, i.e., outside the working surface, and in accordance with the invention, there are a number of holes 207 arranged in a row, under which there are light-sensitive detectors 208 coacting with the galvanometer transducer 205. Along a second side perpendicular to the firstmentioned side of the frame 501 there are further holes 307 arranged in a row, under which there are light-sensitive detectors 308 for coaction with the galvanometer transducer 305. In the intersection of the two rows of holes there is a common hole 507, under which there is a light-sensitive detector 508 for coaction with both transducers 205 and 305. All the detectors are coupled to the computer 209 via the multiplexers 211 and 311.

In normal operation, a beam 502 is directed on to the working surface 501. The working state is interrupted at given intervals by a short calibrating state, a beam 503 for the latter state being illustrated in FIG. 8 by a dashed line. The beam will of course normally come from the same source 201. The galvanometer 204 then directs the beam just outside the working surface but within the operating range of the transducer 305 i.e., within the area of the operating area. The control computer 209 now adjusts the galvanometers 204 and 304 so that the maximum output signal is obtained from the selected detector 308, whereby the computer reads the actual output signal from the transducer 305 in order to obtain the correct angular setting of the transducer. Afterwards, the system returns to the working state. In most cases such a calibrating state can be executed in 0.03 seconds.

The embodiment with two galvanometers according to FIG. 8 differs insignificantly from the embodiment with one galvanometer. The difference is that there are approximately double as many detectors and that the control computer must also adjust the galvanometer which is not calibrated so that the beam impinges on the detectors. The utilisation of signals from the detectors is the same as what has been described for FIG. 6, apart from the fact that the same type of operation must be performed once for each transducer.

I claim:

1. Method of calibrating a positioning system, said system including a control means, wherefrom command signals are sent to a positioning means intended, during a working state, to locate an object in relation to an operating area having a portion thereof being defined as a working surface, the operational situation of the positioning means being sensed and converted to an actual value signal which is fed back to the control means, characterized in that detectors are placed within the operating area in given positions but outside the working surface, and that the working state of the positioning apparatus is interrupted by a calibrating state at given intervals, the positioning means being accurately put in register with at least one of the detectors during such a state, the output signal of the detector being allowed to activate the control means, whereafter the actual value signal is determined and the positioning apparatus calibrated in response to the determined actual value signal.

2. Apparatus for calibrating a positioning system, said apparatus including a control means adapted to send a command value signal intended to activate the positioning means for locating an object in relation to an operating area having a portion thereof defined as a working surface, there also being means arranged for sensing the situation of the object for obtaining an actual value signal which can be utilized by the control means, characterized in that detectors are arranged at given positions within the operating area but outside the working surface, said detectors being connectable to the control unit, and that for given occasions the control means is adapted to put the object in register with at least one detector and to receive an output signal from the detector, and that for an optimum output signal from the detector the control means compares the actual value signal for the position of the object with information on the position of the detector, for calibrating the positioning apparatus.

3. Apparatus as claimed in claim 2, characterized in that the object comprises at least one reflector which is rotatable about a shaft and is illuminated from a radiation source, the reflected beam thereby impinging on the operating area, and that means are provided for rotational movement of the reflector, a transducer being adapted to detect the actual angular position of the reflector shaft.

4. Apparatus as claimed in claim 3, characterized in that the positioning means includes two reflectors, each rotatable about an axis, one axis being in a plane substantially parallel to the main plane of the operating area, the other axis being substantially perpendicular to said main plane.

5. A method of calibrating a positioning system comprising the steps of:

providing a control means, a positioning means, and an operating area having a portion thereof defined as a working surface, sending command signals to the positioning means, during a working state, to locate an object in relation to said operating area, the operational situation of the positioning means being sensed and converted to an value signal which is fed back to the control means;

placing detectors within the operating area but outside of the working surface in given positions;

interrupting the working state of the positioning apparatus by a calibrating state at given intervals;

putting the positioning means in register with at least one of the detectors during the calibrating state, the output signal of said detector being allowed to activate said control means; and determining the actual value signal and calibrating the positioning means in response to the determined actual value signal.

6. Apparatus for calibrating a positioning system comprising:

control means adapted to send a command value signal;

positioning means for locating an object in relation to an operating area having a portion thereof defined as a working surface;

means arranged for sensing the situation of an object for obtaining an actual value signal which can be utilized by the control means;

detectors arranged at given positions within the operating area but outside the working surface, said detectors being connectable to the control means, said control means being interruptable and capable of putting an object in register with at least one detector to receive an output signal from the detector; and the control means, for the optimum output signal from said detector, capable of comparing the actual value signal for positioning of an object with information on the position of the detector for calibration of the positioning means.

7. Apparatus as in claim 6 wherein said positioning means includes at least one reflector which is rotatable about a shaft and is illuminated from a radiation source, the reflected beam thereby impinging on the operating area, and including means for rotational movement of the reflector and further including a transducer being adapted to detect the actual angular position of the reflector shaft.

8. Apparatus as in claim 7 wherein said positioning means includes two reflectors, each rotatable about an axis, one axis being in a plane substantially parallel to the plane of the operating area, the other axis being substantially perpendicular to said plane.

* * * * *